(12) United States Patent
Jendick

(10) Patent No.: US 6,872,913 B1
(45) Date of Patent: Mar. 29, 2005

(54) MARKING OF ARTICLES TO BE INCLUDED IN CANS

(75) Inventor: Manfred Jendick, Recklinghausen (DE)

(73) Assignee: REXAM AB, Malmo (SE)

(*) Notice: Subject to any disclaimer, the term of this patent is extended or adjusted under 35 U.S.C. 154(b) by 53 days.

(21) Appl. No.: 09/723,329

(22) Filed: Nov. 28, 2000

Related U.S. Application Data

(60) Provisional application No. 60/176,013, filed on Jan. 14, 2000.

(51) Int. Cl.[7] .............................................. B23K 26/18
(52) U.S. Cl. .............................. 219/121.68; 219/121.6; 219/121.67; 219/121.69; 219/121.72; 347/224; 347/225; 347/256; 347/259; 372/29.014
(58) Field of Search ........................ 219/121.6, 121.61, 219/121.67, 121.68, 121.69, 121.7, 121.71, 121.72; 347/224, 225, 256, 259; 372/29.014, 19, 2.018; 700/166

(56) References Cited

U.S. PATENT DOCUMENTS

| | | |
|---|---|---|
| 2,641,998 A | 6/1953 | Donald |
| 2,648,278 A | 8/1953 | Neander |
| 3,182,994 A | 5/1965 | Huth |
| 3,549,733 A | 12/1970 | Caddell |
| 3,626,141 A | 12/1971 | Daly |

(List continued on next page.)

FOREIGN PATENT DOCUMENTS

| | | |
|---|---|---|
| CA | 2168435 | 2/1995 |
| CA | 2232871 | 3/1997 |
| DE | 2052 512 | 4/1972 |
| DE | 89 00 453.1 | 4/1989 |

(List continued on next page.)

OTHER PUBLICATIONS

Brochure entitled, "This is PLM Fosie," issued by Swedish Company, PLM Fosie AB (mid 1990's).
JP 07004675, Patent Abstracts of Japan (CD–ROM), Unexamined Applications, vol. 95, No. 1.
JP 07045111, Patent Abstracts of Japan (CD–ROM), Unexamined Applications, vol. 95, No. 2.
JP 04091875, Patent Abstracts of Japan, Abstract of DE 4106151.
Patent Abstracts of Japan, vol. 8, No. 25, E–225 Abstract of JP 58–187091A (Kanebo K.K.) Nov. 1, 1993.
Abstract—JP 0080047784 AA.
Abstract—JP 0080053121 AA.
Abstract—AU 9481794 A.
Culkin & Kugler, "Industrial Laser Processing", The Photonics Design & Applications Handbook, Book 3, 37th International Edition, 1991, pp. H–216–227.
Dr. A.F.H. Kaplan, EuroLaser Academy, 1996/1997, Section "Laser Marking and Scribing", pp. 1–13.
W.M. Steen, "Laser Material Processing", Second Edition, Chapter "6.17.Laser Marking", Springer Verlag, 1998, pp. 263–265, 271.

*Primary Examiner*—Tom Thomas
*Assistant Examiner*—Matthew C Landau
(74) *Attorney, Agent, or Firm*—Nixon & Vanderhye P.C.

(57) ABSTRACT

A laser unit, which provides markings on a surface of a continuous strip of metal, includes a laser for generating a beam of laser radiation. The laser unit further includes a lens arrangement for focusing the laser beam onto the surface of the strip, and a beam scanner that effects a controlled deflection of the laser beam in two mutually perpendicular directions. The beam scanner is arranged intermediate the laser and the lens arrangement. The laser unit is operable to provide laser engraved markings at exact locations on the surface when the strip intermittently is in an immobilized condition before being fed into a subsequent processing apparatus, which mechanically shapes the thus-marked strip into marked articles to be included in cans.

22 Claims, 3 Drawing Sheets

U.S. PATENT DOCUMENTS

| | | | |
|---|---|---|---|
| 3,692,223 A | 9/1972 | Laigle et al. |
| 3,854,647 A | 12/1974 | Mittendorf |
| 3,898,417 A | 8/1975 | Atkinson |
| 4,304,981 A | 12/1981 | Gappa |
| 4,322,016 A | 3/1982 | Barrash |
| 4,323,755 A | 4/1982 | Nierenberg |
| 4,363,179 A | 12/1982 | Ruemer, Jr. et al. |
| 4,375,025 A | 2/1983 | Carlson |
| 4,380,129 A | 4/1983 | Barrash |
| 4,405,852 A | 9/1983 | Bononi |
| 4,431,124 A | 2/1984 | Campbell et al. |
| 4,459,910 A | 7/1984 | Taube |
| 4,476,781 A | 10/1984 | Kubacki et al. |
| 4,517,436 A | 5/1985 | Lawrence |
| 4,564,739 A | 1/1986 | Mattelin |
| 4,635,545 A | 1/1987 | Kubacki |
| 4,675,500 A | 6/1987 | Kunz |
| 4,765,532 A | 8/1988 | Uomoti et al. |
| 4,880,137 A | 11/1989 | Wells |
| 4,910,739 A | 3/1990 | Sheng |
| 5,202,199 A | 4/1993 | Mitzutani et al. |
| 5,206,496 A | 4/1993 | Clement et al. |
| 5,215,864 A | 6/1993 | Laakmann |
| 5,235,454 A | 8/1993 | Iwasaki |
| 5,248,878 A | 9/1993 | Ihara |
| 5,329,090 A | 7/1994 | Woelki et al. |
| 5,465,780 A | 11/1995 | Muntner et al. |
| 5,552,574 A | 9/1996 | Merlin |
| 5,570,384 A | 10/1996 | Nishida et al. |
| 5,578,120 A | 11/1996 | Takahashi et al. |
| 5,593,606 A | 1/1997 | Owen et al. |
| 5,649,363 A | 7/1997 | Rankin, VI |
| 5,653,900 A | 8/1997 | Clement et al. |
| 5,660,516 A | 8/1997 | Artrip |
| 5,660,747 A | 8/1997 | Drouillard et al. |
| 5,719,372 A | 2/1998 | Togari et al. |
| 5,782,024 A | 7/1998 | Pausch |
| 5,817,243 A | 10/1998 | Shaffer |
| 5,854,805 A | 12/1998 | Reid |
| 6,002,098 A | 12/1999 | Pircher et al. |
| 6,080,958 A | 6/2000 | Miller et al. |
| 6,373,876 B1 * | 4/2002 | Dulaney et al. | 372/98 |
| 6,479,787 B1 | 11/2002 | Jendick |
| 6,489,985 B1 * | 12/2002 | Brodsky et al. | 347/247 |

FOREIGN PATENT DOCUMENTS

| | | |
|---|---|---|
| DE | 38 22 097 A1 | 1/1990 |
| DE | 4106151 | 11/1991 |
| DE | 4143339 | 3/1993 |
| DE | 4339321 | 6/1994 |
| DE | 4322252 | 1/1995 |
| DE | 44 35 531 A1 | 4/1995 |
| DE | 43 38 774 A1 | 5/1995 |
| DE | 44 05 203 A1 | 8/1995 |
| DE | 196 39 619 A1 | 3/1997 |
| DE | 19607621 | 9/1997 |
| DE | 298 16 109 U1 | 11/1998 |
| EP | 0 040 929 | 12/1981 |
| EP | 0 085 484 A1 | 8/1983 |
| EP | 0482776 | 4/1992 |
| EP | 208 175 B1 | 3/1993 |
| EP | 0 618 037 A1 | 10/1994 |
| GB | 218563 | 7/1987 |
| JP | 58-187091 | 11/1983 |
| JP | 61086305 | 5/1986 |
| JP | 8-53121 | 2/1996 |
| WO | WO 93/04943 | 3/1993 |
| WO | WO 93/08541 | 4/1993 |
| WO | WO 95/04342 | 2/1995 |
| WO | WO 97/11288 | 3/1997 |
| WO | WO 98/53949 | 12/1998 |
| WO | WO 99/09853 | 3/1999 |
| WO | WO 00/03832 | 1/2000 |

* cited by examiner

MARKING OF ARTICLES TO BE INCLUDED IN CANS

This application claims the benefit of Provisional Application No. 60/176,013, filed Jan. 14, 2000.

TECHNICAL FIELD

The present invention generally concerns the technique of manufacturing articles to be included in cans, in particular beverage cans. The invention is specifically, but not exclusively, related to articles in the form of opening tabs to be attached to shells for forming ends to such cans.

BACKGROUND ART

In a brochure entitled "This is PLM Fosie" issued by Applicant's Swedish company PLM Fosie AB in the mid nineties, there is shown on p. 6 how can ends are produced.

In a first production stage, a thin metal strip, preferably a 0.23-mm-thick aluminum strip, is fed to a processing apparatus in which the strip is punched and stamped to form opening tabs integrated with the strip. The tabs are also referred to as opener rings by persons skilled in the art.

In a second production stage, circular shells for forming the can ends are die cut from a thin metal sheet, preferably a 0.23-mm-thick aluminum sheet. Each shell is scored for opening, and a rivet for attachment of the tab is formed at the center of the shell.

In a third production stage, the strip with the integrated tabs are joined with the circular shells in an attachment station, in which the tabs are separated from the strip and attached to the shells by riveting. A finished can end is achieved when the tab is fastened to the shell.

This manufacture of can ends is conventional and well known to the skilled person. It should be mentioned that the whole process is automated with a capacity of about 2,000 ends per line per minute. In the beverage can industry, the production rate in general is very high and it is a continuous aim to decrease the production costs and the material used for can production, including the ends. Maintenance, tool changes and other downtime should be avoided to keep costs low.

As in other areas of the food and beverage industry, the traceability of the manufacturing and filling of the can is important. Today, there are so-called traceability marks or markings on the cans indicating when the filling took place and also when the main can body was manufactured. Normally, however, there is no traceability marking indicating when the finished can ends were produced. Such markings are often required for reasons of quality. For instance, the peripheral edge of the shell must be precisely formed to ensure a completely tight seam against the upper flange of the can. There are also several functional requirements placed on the tab and on the attachment of the same to the shell.

Except for the purpose of indicating the origin of the tabs, the markings on the same may also be used in other contexts. In a commercial aspect, markings on the bottom surface of the tab may indicate the winner in a lottery or the like. The quality requirements on such "promotional" markings are normally the same as in the cases where the origin is indicated.

Thus, there is a need for indicative markings on the tabs and the shells as well as on the can body.

U.S. Pat. No. 4,459,910 discloses an arrangement for producing marked tabs from a continuous strip of metal. This arrangement comprises a press which, by a stamping and punching operation, shapes the strip into tabs to be included in cans. A feeder is arranged to intermittently feed the strip through the press at a rate commensurate with the operation of press. Markings are provided on a surface of the strip by means of an embossing machine arranged upstream of the press. The embossing machine comprises a plurality of embossing stamps arranged in an indexing wheel, so that different markings can be applied to the strip. Another machine for mechanically providing indicative markings on sheet metal by a stamping operation is disclosed in U.S. Pat. No. 4,476,781.

One general problem in using such stamping or embossing operations to provide small indicative markings on metal surfaces is that these surfaces should be non-coated for acceptable results. Thus, surfaces that are coated with lacquer and/or paint can not readily be provided with such markings. The task of providing markings on the tab is especially difficult, due to the small tab surfaces available and the high requirements of elevated production rate. For material saving reasons, modern opening tabs are quite small, inevitably leaving only very limited tab surfaces for markings at high speed. If such markings are to be provided by stamping operations or the like, the tab surfaces must be increased. However, a this calls for costly changes in the production equipment, increases the material cost and involves a risk of non-acceptance by the consumers. Further, the layout of "promotional" markings might be changed quite frequently, calling for frequent change of the tooling used for stamping the markings. Since such tooling is quite expensive, the cost for providing "promotional" markings can be considerable.

SUMMARY OF THE INVENTION

The object of the invention is to find a solution to the above described problems and to provide an improved technique for manufacturing articles to be included in cans, which articles have distinct and indicative markings.

This object is achieved by a laser unit and an arrangement according to the appended independent claims. Preferred embodiments are defined in the dependent claims.

The invention brings out several advantages. An enhanced technique of providing distinct markings on the article is accomplished, also when very limited areas are available for marking, such as on opening tabs. The new technique is suitable for the high production rates required in modern beverage can manufacturing. Further, the use of laser radiation permits marking of both non-coated and coated surfaces. Also, the layout of the markings can easily be changed, for example by input of a new engraving pattern to a control unit, e.g. a computer, that controls the engraving operation performed by the laser unit. In the case of traceability markings, the pattern can be updated every minute to provide an exact indication of when the finished article was produced. Likewise, promotional markings can be provided with great flexibility. Further, since a standard tab can be used, there is no need for tool change in the production line when no laser engravings are desired. The same production line can be used in both cases, since the operation of the laser unit in the preferred embodiment is easily disconnectible.

BRIEF DESCRIPTION OF THE DRAWINGS

In the following, presently preferred embodiments of the invention will be described, reference being made to the accompanying schematic drawings.

DESCRIPTION OF PREFERRED EMBODIMENTS

Figure 1:
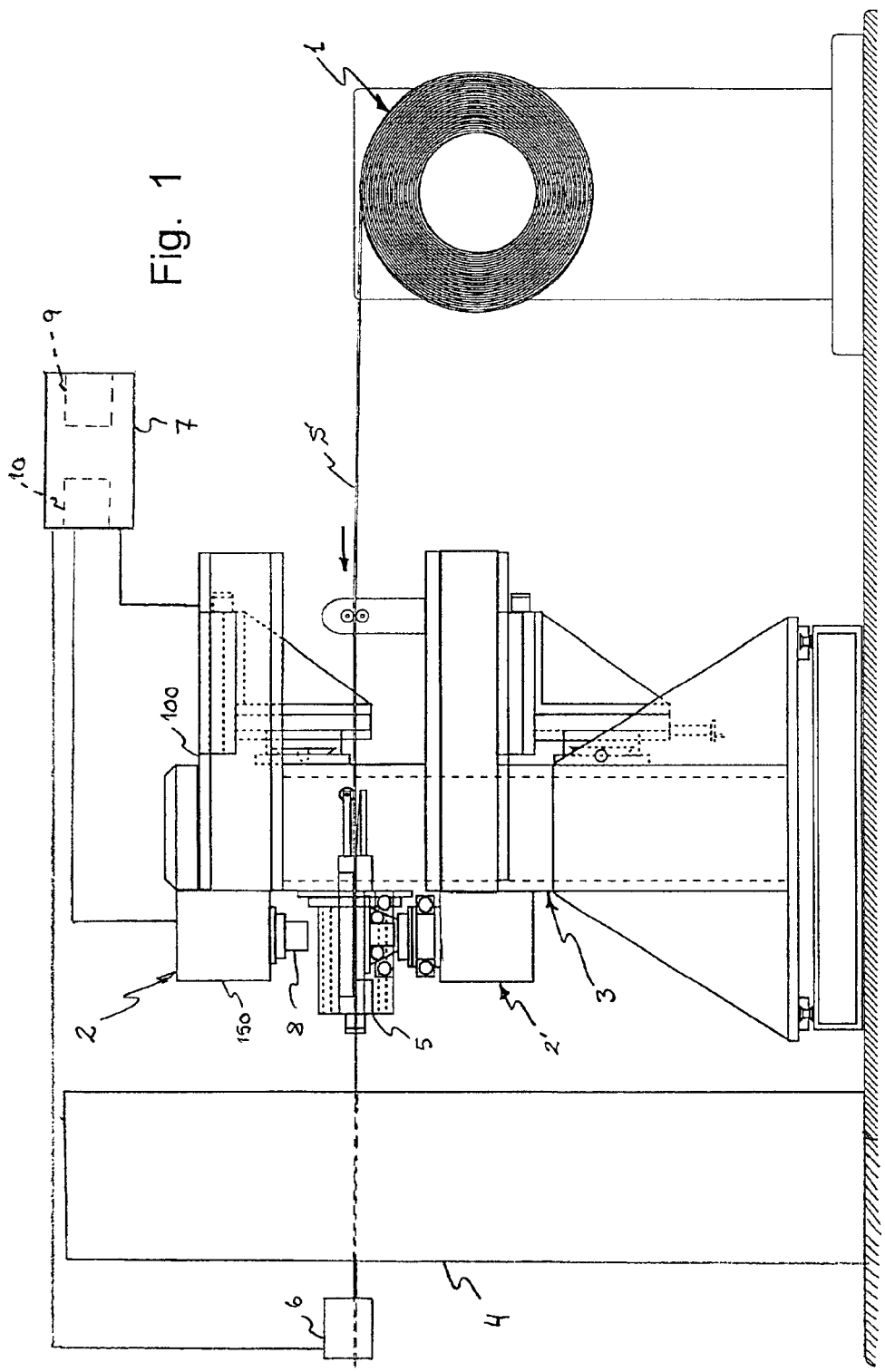
FIG. 1 is a side view of an arrangement including a laser unit according to a preferred embodiment of the invention.

FIG. 1 shows part of an arrangement for manufacture of marked opening rings or tabs T (shown in FIGS. 2–4) to be included in ends for beverage cans (not shown). A blank in the form of a thin, continuous metal strip S is fed from a supply 1 to a laser unit 2 supported by a supporting member 3, and finally fed to a tab forming unit 4 which is of a type known per se and which forms the tabs T by punching and stamping the strip S.

The strip S is guided by a guiding device 5 when passing below the laser unit 2, and fed from the supply 1 by a feeding means 6 arranged in association with the tab forming unit 4. In the unit 4, the strip S is punched and stamped to form the tabs T integrated with the strip S.

In this type of arrangement, the strip S is only intermittently fed, or indexed, into the tab forming unit 4. Thus, the feeding means 6 is activated to feed the strip S after each completed stamping and punching operation in the tab forming unit 4.

The feeding rate of the strip S and the operation of the laser unit 2 are controlled by a computerized control unit 7 connected to the strip feeding means 6 and the laser unit 2. The laser unit 2, which will be described more in detail below, comprises a high-power and high-speed laser 100 capable of providing engravings in the tab surface, preferably with a depth of about 1–5 $\mu$m. Thus, the laser unit 2 is arranged between the strip supply 1 and the tab forming unit 4. Between the laser unit 2 and the guiding means 5 there is provided a device 8 for protecting the laser unit 2 from dust produced in the engraving process. It should be pointed out that the laser unit 2 may be installed in a standard production line for tabs T. The operation of the laser unit 2 may be disconnected, in which case the tab production line is used in a conventional manner.

The purpose of the laser unit 2 is to provide indicative, laser engraved markings on at least one of the upper and lower surfaces of the strip S depending on whether markings are desired on the top surface or on the bottom surface of the tab T, or on both these surfaces. In the embodiment shown in FIG. 1, the arrangement includes a second laser unit 2' which is arranged opposite to the laser unit 2 and is adapted to provide markings on an opposite side of the strip S. The following description of the laser unit 2 is equally applicable to the second laser unit 2' and will therefore not be repeated.

Figure 2:
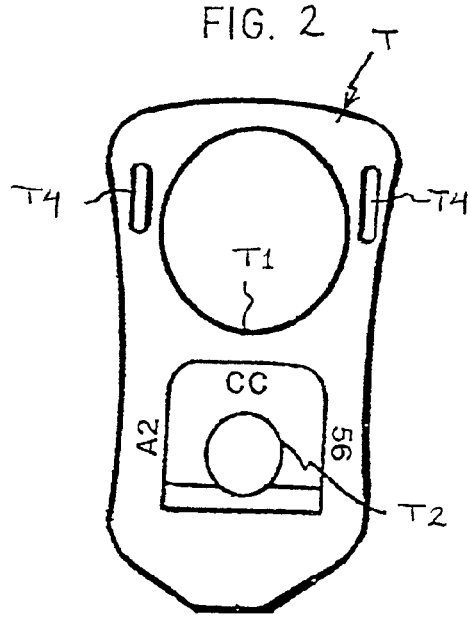
FIG. 2 is a top view of an opening tab having markings on its top surface.
Figure 3:
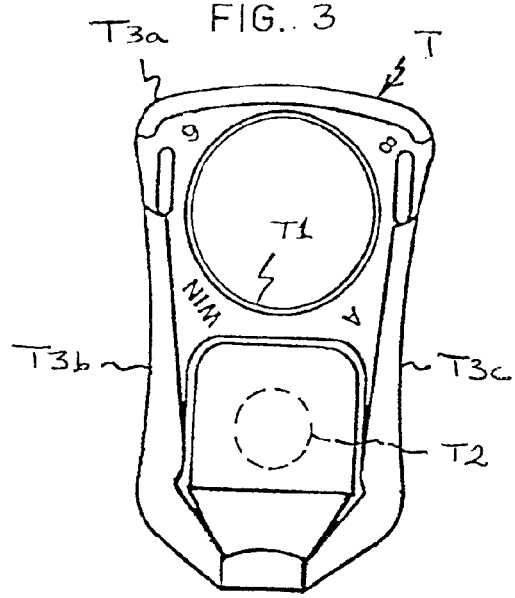
FIG. 3 is a bottom view of a tab having markings on its bottom surface.

As shown in FIGS. 2 and 3, each tab T has an opening T1 and a rivet portion T2. In the tab forming operations, the peripheral edge portions T3a, T3b, T3c are bent inwardly in a manner known per se, as shown in FIG. 3. The purpose of this bending is to increase the stiffness of the tab T. Further, the tab T has a stiffening recess T4 on either side of the opening T1, see FIG. 2. The tab T shown in FIG. 2 has laser engraved markings A2, CC, 56 on its top surface, whereas the tab T in FIG. 3 has laser engraved markings WIN, A, 98 on its bottom surface.

The top markings A2, CC, 56 on the tab T shown in FIG. 2 serve as traceability markings indicating when the tab T was manufactured. These markings are codified in accordance with a specific system, where A2 is a week code (A–Z=week 1–26, a–z=week 27–52), CC is an hour code (A–X=hour 1–24) and 56 is a minute code (1–60). By this code system, it is exactly indicated when the tab T was produced.

The bottom markings WIN, A, 98 on the tab T shown in FIG. 3 serve as indications of a lottery, where the marking WIN indicates that the person who opens the can by means of the tab T is a winner. The other markings on the tab A, 98 constitute an identification of the lottery in question.

Figure 4:
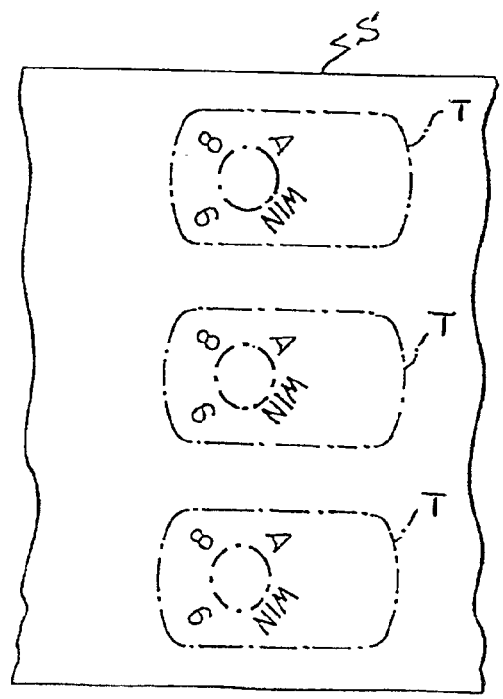
FIG. 4 is a plan view of a portion of a metal strip used for producing the tabs shown in FIGS. 2–3.

FIG. 4 shows a portion of the strip S after the laser engraving operation, and before the tab forming unit 4. The laser unit 2 has engraved the markings WIN, A, 98 on one surface of the strip S. The approximate periphery of the tab to be produced in the following tab forming steps in the unit 4 has been indicated with ghost lines in FIG. 4. In practice, the size of the laser engraved markings is about 1.4×1.2 mm, which makes them easily readable.

Figure 5:
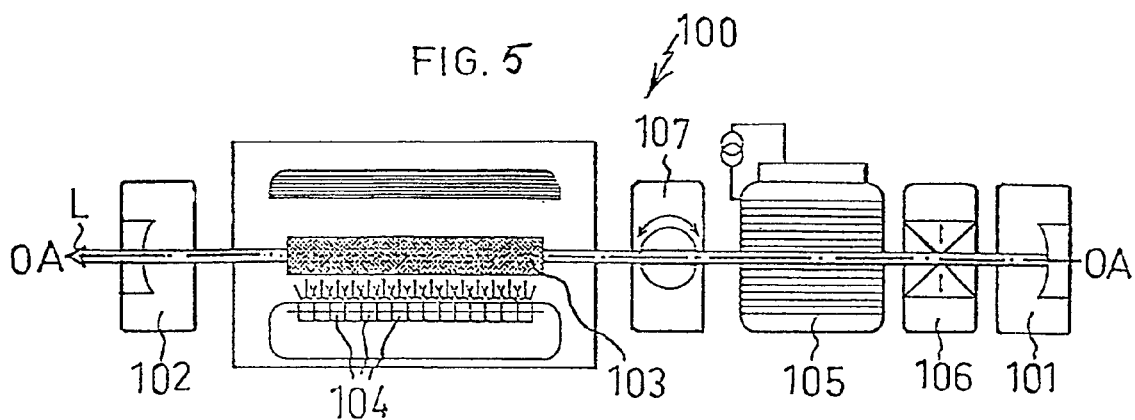
FIG. 5 is schematic view of a first part of a laser unit according to a preferred embodiment of the invention.
Figure 6:
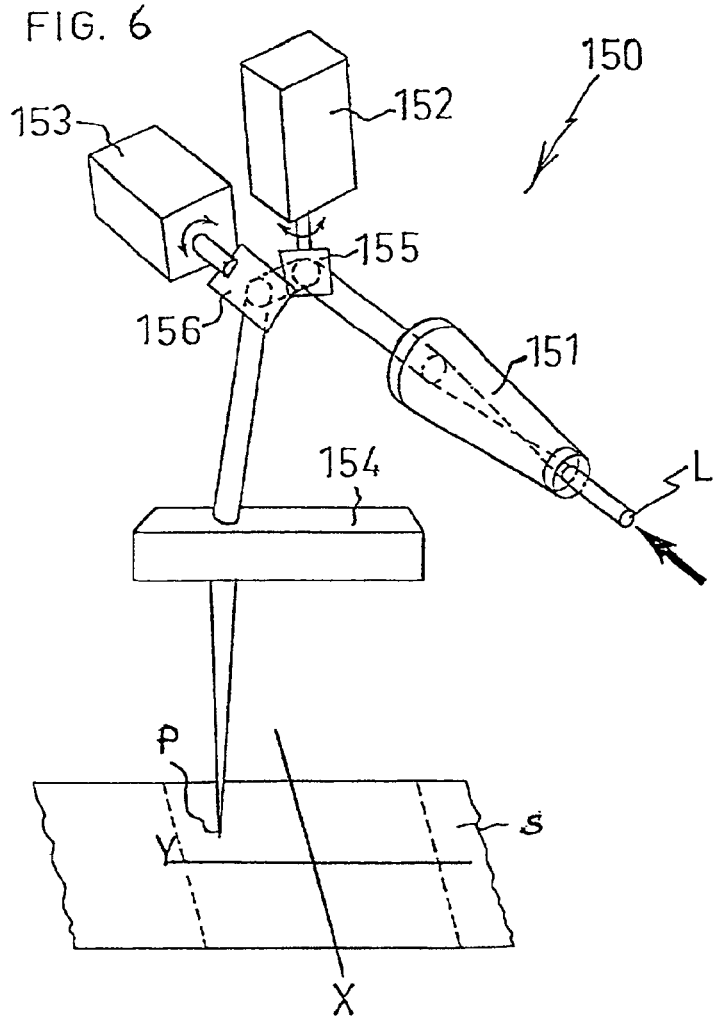
FIG. 6 is a perspective view of a second part of a laser unit according to a preferred embodiment of the invention.

As indicated in FIG. 1 and shown in detail in FIGS. 5–6, the laser unit 2 comprises a laser 100 which is adapted to generate laser radiation in the form of a beam L at a suitable wavelength, and a so-called scanner head 150 which is adapted to receive the laser beam L from the laser 100 and focus and direct the generated laser beam L to a given location P on the strip surface. The inventive laser unit is operable to effect the laser engraving operation during the time period when the tab forming unit 4 performs a stamping and punching operation, i.e. when the strip S is in an immobilized condition. Therefore, the scanner head 150 is capable of focusing the laser radiation to a small spot and control the position of this spot in two dimensions on the strip surface. The requirements on the laser unit 2 are high in the sense that the laser engraved markings must be provided in an extremely short time due to the high feeding rate of the strip S. The laser radiation also has to be very accurately positioned on the strip S, since the tab surface available for the markings is very small.

It is preferred that the laser 100 generates radiation in the near IR region of approximately 1–10 $\mu$m since aluminum, normally used for manufacture of cans, exhibits high absorption of radiation in this region.

Further, it is preferred that the laser 100 is capable of generating pulsed laser radiation, since the maximum power of a laser pulse can be many times the rated power of the laser. This will increase the engraving efficiency of the laser unit 2.

In the most preferred embodiment, shown in FIG. 5, the laser 100 is a Nd:YAG laser generating radiation at 1.064 $\mu$m, and in particular a diode laser pumped Nd:YAG laser since this laser is capable of generating laser radiation with good mode quality. Thus, the radiation can be focused to a minute volume producing very distinct engravings. Compared to a conventional flash-lamp pumped Nd:YAG laser, the diode laser pumped Nd:YAG laser also has a high electrical to optical efficiency and, thus, less need for cooling.

The laser 100 of FIG. 5 outputs a laser beam L which is generated in an optical cavity defined by a highly reflecting rear mirror 101 and a partially reflecting (R≈80%) front mirror 102. A lasing medium 103 of Nd:YAG is arranged on the optical axis OA of the cavity and is surrounded by diode lasers 104 for pumping of the medium 103. A so-called Q-switch 105, e.g. a Pockels cell, is arranged in the cavity in a manner known per se, for generating intense lasing in a very short time period resulting in very high peak power laser pulses. A mode selection element 106, e.g. an iris diaphragm, is arranged within the laser cavity to block outer portions of the laser beam L in order to optimize its transverse mode characteristics. Thus, the laser can be forced to operate in a transverse mode that can be focused to a small volume, e.g. $TEM_{00}$. A shutter 107 is provided for blanking off the laser beam L.

Excellent results have been achieved in practice by a modified version of a diode laser pumped Nd:YAG laser (DynaMark T2) marketed by the German company IWKA. The laser emits pulses with a duration of 25 ns in a cycle time of approximately 0.1–1 $\mu$s. The average power per pulse is 25 kW, with a peak pulse power of about 100 kW. This laser power is adequate for engraving colored metal surfaces, but should be increased when engraving bare metal surfaces.

The scanner head 150 of FIG. 6 receives the laser beam L from the laser 100 and focuses it to a small spot P on the surface of the strip S. The scanner head 150 comprises a telescope 151 for beam expansion, two deflection devices 152, 153 for beam deflection, and a lens arrangement 154 for beam focusing. The laser beam L is first directed through the telescope 151 to increase the beam diameter. This will reduce the beam power per unit area to minimize damages to successive optical components and to optimize the beam size on the lens arrangement 154. Further, the size of the focal spot P on the strip surface will decrease by this procedure.

Each deflection device 152, 153 controls the deflection of the laser beam in one respective direction (x, y). By the combined action of the two deflection devices 152, 153, the laser beam L can be controlled in two dimensions over the strip surface. The deflection devices 152, 153, as well as the laser 100, are operated by the computerized control unit 7 (FIG. 1). Preferably, the deflection devices 152, 153 are galvanometers of a type known per se, in which the rotation of a mirror 155, 156 is controlled by means of an electromagnetic field and feedback control.

After passing the deflection devices 152, 153 the laser beam is directed through the lens arrangement 154, preferably a so-called flat-field lens. Such a flat-field lens is designed to focus the laser beam L perpendicular to a geometrical plane, in this case the strip surface. The focal length of the flat-field lens should be chosen with great care. With a large focal length, a small rotation of the mirrors 155, 156 will yield a large movement of the focal spot P on the strip surface, thereby allowing for fast displacement of the spot P. However, a too large focal length will yield a low precision in the positioning of the spot P as well as a larger spot size. A focal length of 120–190 mm has been found adequate, and optimum performance is achieved with a focal length of about 150–180 mm.

In the embodiment shown on the drawings, the control unit 7 is adapted to receive a pattern to be engraved on the surface of the strip S. This pattern is stored in a memory 9. A processor 10 is adapted to operate the laser unit 2 to produce the pattern in the strip surface. More specifically, the processor 10 is adapted to control the laser 100 to generate a laser pulse, and the scanner 150 to direct the laser radiation to a desired location P on the strip surface. Preferably, the processor 10 controls the time period between successive laser pulses, by controlling the Q-switch 105 and the diode lasers 104 of the laser 100, such that each laser pulse has sufficient energy to generate a visible pit with a depth of about 1–5 $\mu$m in the strip surface. Thus, although not evident from the drawings, each marking engraved in the strip surface is formed by a large number of such pits. Between each laser pulse, the mirrors 155, 156 of the deflection devices 152, 153 are controlled to move to a new location, thereby producing the pattern in the strip surface.

Since only a limited time period is available for producing the desired pattern in the strip surface, the processor 10 is adapted to, when a pattern is fed to and stored in the memory 9, calculate the positions of all pits in the strip surface. Further, before operating the laser unit 2, the processor 10 determines the optimum engraving path, i.e. the order in which the pits should be produced in the strip surface to form the pattern. In this context, it is preferred that the markings or characters in the pattern are engraved sequentially, i.e. that one marking is completed before another marking is provided. This approach has the ability of increasing both the engraving speed and the engraving accuracy, by minimizing vibrations in the mirrors 155, 156. Such vibrations might occur when the mirrors 155, 156 are brought to a halt on rotation to a new position, especially if the mirrors 155, 156 are rotated over a large angle. Thus, the distance between subsequent pits should be minimized.

As shown in FIG. 3, the markings are laser engraved on the tab surface between the opening T1 and the inwardly bent edge portions T3$a$, T3$b$ and T3$c$ provided by bending means (not shown) included in the tab forming unit 4. As explained above, the laser unit 2 must be controlled very accurately by means of the control unit 7 in order to provide distinct laser engraved markings on this small surface of the tab T. The positioning control of the focal spot P is important. Since there is a continuous aim to reduce the strip material used, the width of the tab T should be as small as possible, thus leaving only a limited surface for markings. By the high-power laser engraving according to the invention, distinct and indicative markings are provided on the tab T in spite of the small tab surface available.

In order for the tab forming unit 4 to form each tab from the intended portion of the strip S (cf. the laser-engraved areas marked by ghost lines in FIG. 4), the engraving operation should be effected as close as possible to the tab forming operation. However, the laser unit 2 should preferably be physically disconnected from the tab forming unit 4 due to the excessive vibrations produced in the latter. Preferably, a sensor (not shown) is arranged in association with the strip feeding means 6 or the tab forming unit 4. The sensor is adapted to indicate when the strip 1 is in an immobilized condition, e.g. by sensing a dwell condition of the strip feeding means 6, or the tab forming unit 4. The output signal of the sensor is fed to the control unit 7 which initiates the laser engraving operation on the surface of the immobilized strip S.

The laser unit 2 is disconnectible, which makes it possible to use the apparatus as a standard production line as well, even temporarily.

By effecting the laser engraving operation during the dwell time of the strip feeding means 6, the strip can be completely immobilized during the engraving operation. Typically, the tab production unit 4 operates at a speed of 640 strokes/min or higher, with the strip S being immobilized during approximately 60 ms. In this time, the inventive laser unit is capable of providing three laterally spaced tab-forming strip portions with six laser-engraved letters each, the letters having a height of about 1.4–2 mm (cf. FIG. 4).

Finally, it should be emphasized that the invention by no means is restricted to the embodiments described in the foregoing, and modifications are feasible within the scope of the appended claims. For example, a cw $CO_2$ laser could be used, although the focal spot P will be comparatively large since the laser has non-optimum mode characteristics and yields radiation at a longer wavelength (10.6 µm). Other suitable laser types might be used.

It should also be mentioned that the tabs T could be formed in the tab forming unit 4 by other means than stamping and punching operations.

It is also feasible to provide markings on a strip which has a coating, such as lacquer and/or paint. In this case, a lower laser power can be employed, since visible markings can be produced by selectively removing the coating from the strip surface.

The invention could also be used for laser engraving of other articles to be included in a can, for example the above-mentioned shell or the can body.

What is clamed is:

1. A laser unit for providing markings on a surface of a continuous strip of metal, said laser unit comprising:
   a beam generator configured to generate a beam of laser radiation to provide said markings in a metal;
   a beam focuser, associated with the beam generator, that focuses the laser beam onto said surface of said strip;
   a beam deflector, associated with the beam focuser, that effects a controlled deflection of the laser beam, said beam deflector being arranged intermediate the beam generator and the beam focuser; and
   a control unit having a memory that receives and stores a pattern to be engraved on said surface and a processor programmed to operate said laser unit to produce said pattern on said surface of said strip,
   wherein:
      said control unit is set to control said laser unit to provide laser engraved markings at exact locations on said surface when said strip intermittently is in an immobilized condition before being fed into a processing apparatus structured to mechanically shape the thus-marked strip into marked articles to be included in cans,
      said beam generator is configured to produce laser pulses, and
      an average power per pulse is at least 25 KW.

2. A laser unit as set forth in claim 1, wherein said laser unit is operable to provide about 1–5 µm deep engravings in said surface of said strip.

3. A laser unit as set forth in claim 1, wherein said processor is adapted to conjointly control said beam generator and said beam deflector such that at least one pulse of laser radiation outputted by the beam generator forms visible pits in said surface, so as to form a number of said pits in said surface to reproduce said pattern.

4. A laser unit as set forth in claim 3, wherein said processor is programmed to control a time period between subsequent pulses such that each pulse has sufficient energy to generate one of said pits.

5. A laser unit as set forth in claim 3, wherein said processor is adapted to, based on said pattern in said memory, calculate positions of all of said pits on said surface before operating said laser unit to produce said pattern.

6. A laser unit as set forth in claim 3, wherein said processor is programmed to determine an optimum engraving path in which the pits should be produced in the surface to form the pattern, such that the distance between subsequently engraved pits is minimized.

7. A laser unit as set forth in claim 1, wherein said pattern comprises a number of characters.

8. A laser unit as set forth in claim 7, wherein said processor is programmed to control the beam deflector such that said characters are provided sequentially one after another on said surface.

9. A laser unit as set forth in claim 1, wherein said marked articles are opening tabs to be attached to ends for cans.

10. A laser unit as set forth in claim 9, wherein said laser unit is operable to provide the laser engraved markings on said surface of said strip such that each of said marked tabs have said markings on a tab surface between an opening in said tab and bent edge portions of the tab.

11. A laser unit as set forth in claim 1, wherein said control unit is set to control the feeding rate of the strip into the processing apparatus.

12. A laser unit as set forth in claim 1, wherein a height of each of the characters is about 1.4–2 mm.

13. A laser unit as set forth in claim 1, wherein the beam generator is selected from the group consisting of YAG and $CO_2$ laser beam generators.

14. A laser unit as set forth in claim 1 further comprising a modulator to produce laser pulses.

15. A laser unit as set forth in claim 14, wherein the modulator is a Q-switch.

16. A laser unit as set forth in claim 1, wherein peak pulse power is at least 100 KW.

17. A laser unit for providing markings on a surface of a continuous strip of metal, said laser unit comprising:
   a beam generator configured to generate a beam of laser radiation configured to provide said markings in a metal:
   a beam focuser, associated with the beam generator, that focuses the laser beam onto said surface of said strip;
   a beam deflector, associated with the beam focuser, that effects a controlled deflection of the laser beam, said beam deflector being arranged intermediate the beam generator and the beam focuser; and
   a control unit having a memory that receives and stores a pattern to be engraved on said surface and a processor programmed to operate said laser unit to produce said pattern on said surface of said strip,
   wherein:
      said processor is programmed to control said laser unit to provide a large number of visible pits in said surface to produce said pattern within a dwell time when the strip intermittently is in an immobilized condition, the dwell time being less than about 60 ms,
      said beam generator is configured to produce laser pulses, and
      an average power per pulse is at least 25 KW.

18. A laser unit for providing markings on a surface of a continuous strip of metal, said laser unit comprising:
   a beam generator configured to generate a beam of laser radiation to provide said markings in a metal;
   a beam focuser, associated with the beam generator, that focuses the laser beam onto said surface of said strip;
   a beam deflector, associated with the beam focuser, that effects a controlled deflection of the laser beam, said beam deflector being arranged intermediate the beam generator and the beam focuser; and
   a control unit having a memory that receives and stores a pattern to be engraved on said surface and a processor programmed to operate said laser unit to produce said pattern on said surface of said strip,
   wherein said control unit is set to control said laser unit to provide laser engraved markings at exact locations on said surface when said strip intermittently is in an immobilized condition before being fed into a processing apparatus structured to mechanically shape the thus-marked strip into marked articles to be included in cans, and wherein the beam focuser comprises a lens having a focal length of between about 120–190 mm.

19. A laser unit as set forth in claim 18, wherein the focal length is between about 150–180 mm.

20. A laser unit for providing markings on a surface of a continuous strip of metal, said laser unit comprising:

a beam generator configured to generate a beam of laser radiation to provide said markings in a metal;

a beam focuser, associated with the beam generator, that focuses the laser beam onto said surface of said strip;

a beam deflector, associated with the beam focuser, that effects a controlled deflection of the laser beam, said beam deflector being arranged intermediate the beam generator and the beam focuser; and a control unit having a memory that receives and stores a pattern to be engraved on said surface and a processor programmed to operate said laser unit to produce said pattern on said surface of said strip, wherein said control unit is set to control said laser unit to provide laser engraved markings at exact locations on said surface when said strip intermittently is in an immobilized condition before being fed into a processing apparatus structured to mechanically shape the thus-marked strip into marked articles to be included in cans, and wherein the beam generator is configured to generate the beam with a pulse duration of 25 nanoseconds in a cycle time of 0.1–1 $\mu$s.

21. A laser unit for providing markings on a surface of a continuous strip of metal, said laser unit comprising:

a beam generator configured to generate a beam of laser radiation to provide said markings in a metal;

a beam focuser, associated with the beam generator, that focuses the laser beam onto said surface of said strip;

a beam deflector, associated with the beam focuser, that effects a controlled deflection of the laser beam, said beam deflector being arranged intermediate the beam generator and the beam focuser; and a control unit having a memory that receives and stores a pattern to be engraved on said surface and a processor programmed to operate said laser unit to produce said pattern on said surface of said strip, wherein said control unit is set to control said laser unit to provide laser engraved markings at exact locations on said surface when said strip intermittently is in an immobilized condition before being fed into a processing apparatus structured to mechanically shape the thus-marked strip into marked articles to be included in cans, and wherein the beam generator includes a mode selection element to obtain suitable transverse mode characteristics.

22. A laser unit as set forth in claim 21, wherein the mode selection element comprises an iris diaphragm arranged to block outer portions of the beam.

* * * * *